United States Patent [19]

Schneider

[11] 4,277,272

[45] Jul. 7, 1981

[54] METHOD FOR THE MANUFACTURE OF A MULTI-CHANNEL FIBER OPTICAL WAVEGUIDE

[75] Inventor: Hartmut Schneider, Munich, Fed. Rep. of Germany

[73] Assignee: Siemens Aktiengesellschaft, Berlin & Munich, Fed. Rep. of Germany

[21] Appl. No.: 124,609

[22] Filed: Feb. 25, 1980

[30] Foreign Application Priority Data

Mar. 9, 1979 [DE] Fed. Rep. of Germany ........ 2909390

[51] Int. Cl.³ ............................................ C03B 37/075
[52] U.S. Cl. ...................................... 65/3 A; 65/31; 427/163; 427/237; 427/264; 427/266
[58] Field of Search .................. 65/3 A, 31; 427/163, 427/237, 264, 266

[56] References Cited

U.S. PATENT DOCUMENTS 4,049,413 9/1977 French ................................... 65/3 A
4,229,197 10/1980 Streng ............................... 65/3 A X

FOREIGN PATENT DOCUMENTS 2302556 7/1974 Fed. Rep. of Germany ............ 65/3 A
2630365 1/1978 Fed. Rep. of Germany ............ 65/3 A Primary Examiner—Richard V. Fisher
Attorney, Agent, or Firm—Hill, Van Santen, Steadman, Chiara & Simpson

[57] ABSTRACT

A method for forming a preform which is subsequently drawn into a multi-channel fiber optical wave guide having a plurality of wave guide cores embedded in a cladding material, characterized by providing a quartz glass tube having an inner surface covered by a layer of cladding material, which in turn is covered by a layer of core material, removing strips of the core material to form parallel, symmetrically disposed strip-like portions of the core material, and heating the tube to cause the collapsing of the tube into the preform with buckling in the areas free of the strip-like portions of core material so that heat of the strip-like portions of core material become completely surrounded by cladding material and then subsequently drawing the preform into the optical fiber.

6 Claims, 5 Drawing Figures

METHOD FOR THE MANUFACTURE OF A MULTI-CHANNEL FIBER OPTICAL WAVEGUIDE

BACKGROUND OF THE PRESENT INVENTION

The present invention is directed to a method for the manufacture of a multi-channel fiber optical waveguide which has several optical waveguide cores embedded in a fiber optical waveguide cladding material.

The manufacturing method for producing a multi-channel fiber optical waveguide having fiber optical waveguide cores embedded in a cladding material is disclosed in German O.S. No. 26 30 365. The manufacturing process comprises drawing a preform from a double crucible with the other crucible having a nozzle with a ring shaped aperture and the inner crucible having a number of nozzles which correspond to the number of cores of the fiber. The material for the fiber optical waveguide cladding or jacket is placed in the outer crucible and the material for the fiber optical waveguide cores is filled in the inner crucible. This preform is then drawn into a fiber optical waveguide which has a very good quality.

SUMMARY OF THE INVENTION

The present invention is directed to providing a new method for the manufacture of a multi-channel fiber optical waveguide which produces a waveguide with the quality of the fiber being increased and especially with a further reduction in the attenuation.

To accomplish this object, the method includes providing a quartz glass tube having an interior surface, providing a layer of cladding material on the interior surface of the glass tube, providing a layer of core material on the layer of cladding material, removing strips of a layer of core material to form strip-like portions of core material with the number of strip-like portions corresponding to the number of fiber cores and distributed symmetrically on the inner circumference of the layer of cladding material with each of the strip-like portions extending parallel to the axis of the quartz glass tube, then heating the quartz glass tube to collapse it into a rod-shaped preform with each of the strip-like portions of the core material forming cores surrounded by cladding material, and then drawing the preform into the fiber.

In the present method, both the cladding or the jacket material and the core material are glass layers which are applied with the highest degree of purity, for example by utilizing a chemical vapor deposition process. Since no impurities can get into the jacket or cladding material and the core glass layers during the collapsing and the subsequent drawing step, the fiber optical waveguide, which is produced, will have the lowest possible attenuation known up to this time.

During the time of the step of collapsing, the quartz glass tube will collapse more quickly in the regions of the thinner wall thickness, which are the regions in which the strips of the core glass layer have been removed, than in the regions which have the normal wall thickness with the strip-like portions of the core glass material. If, for example, two strips of the core glass layer have been removed, the tube will collapse into a cross section of a figure eight and waist portions will appear in the area where the core glass layer has been removed. In the area of the collapsing waist portions, the cladding glass melts together so that a number of separated fiber optical waveguide cores, which correspond to the number of strips will occur in the preform. The diameter of the cores and their spacing from one another can be dimensioned by the thickness of the deposited core glass layer and the width of the strips which were removed.

In an advantageous further embodiment of the method, it is provided that the strip of the core glass layer material are removed by means of a gas phase etching method. For this, a gas phase selected from a group consisting of hydrogen, deuterium, water vapor and halides is passed through the quartz glass tube. A limited burning spot, which is produced by a heating source, is then guided uniformly along the tube parallel to the axis of the tube. As a heating source, either an oxyhydrogen gas burner or a laser can be used. The diameter of the burning spot will determine the etching width and therefore determines the width of the strip of the core glass layer that is removed. By means of repeated heating, the etching depth can be increased.

It is a further advantageous embodiment of the method which utilizes a cladding material, which has a viscosity which is lower than the viscosity of the core glass material. During the step of heating to collapse the quartz tube, the quartz tube therefore will contract more easily in the strip-like areas, which are free of the layer of core material.

The multi-channel fiber optical waveguides, which are manufactured according to the method of the present invention will display very low losses and a definite coupling relationship. Besides this, they are compatible with known one-channel fiber optical waveguides. They are, therefore, excellently suitable as a directional coupler in a fiber optical waveguide network and are also suited to be used in place of beam splitters which are used in interferrometric fiber optical waveguide devices, for example, an optical rotation sensor.

For directional couplers of this type, the fiber optical waveguide cores must be directed parallel for a definite distance in order to obtain a specific coupling relationship. After this distance, they must be guided away from one another. The light waveguide fiber should thus be splittable in a longitudinal direction so that the ends of the fiber optical waveguide can be broken up into partial fibers with each partial fiber containing only one optical core.

DESCRIPTION OF THE PREFERRED EMBODIMENTS

Figure 5:
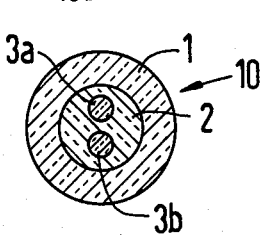
FIG. 5 is an enlarged cross sectional view after the collasping of the tube into the preform.

The principles of the present invention are particularly useful in providing a preform generally indicated at 10 in FIG. 5. The preform 10 is for an optical fiber waveguide which has a plurality of cores such as 3a and 3b embedded in a cladding material 2 as illustrated in FIG. 5. This preform is subsequently drawn into the optical fiber.

Figure 1:
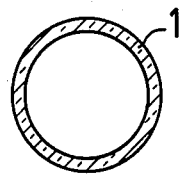
FIG. 1 is a cross sectional view of a quartz glass tube provided during the method.
Figure 2:
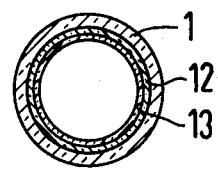
FIG. 2 is a cross sectional view of the quartz glass tube after providing the layer of cladding material and the layer of core material.
Figure 3:
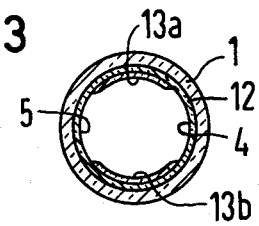
FIG. 3 is a cross sectional view of the tube after the step of removing portions of the layer of core materials.

To practice the invention, the method provides a quartz glass tube 1, which to a certain extent serves as a supporting tube for the light waveguide to be manufactured. In a first method step after the provision of the tube 1, the interior surface of the quartz glass tube is provided with a layer 12 of a cladding or jacket glass material in accordance with a chemical vapor deposition method. Subsequently thereto, a layer 13 of core glass material is deposited on the layer 12. After providing the layers 12 an 13, the next step of the method is removing portions of the layer 13 of cores materials so that strips 4 and 5 (see FIG. 3) have been removed to expose portions of the layer 12 of cladding material. As illustrated in FIG. 2, only two strips 4 and 5 of the core glass layer have been removed and these two strips are oriented to lie opposite to one another and extend parallel to the axis of the core glass 1. After removal of the two strips 4 and 5, strip-like portions 13a and 13b are left which as illustrated are symmetrically arranged on the inner circumference of the layer 12. It should be noted, that if more than two cores such as 3a and 3b of FIG. 5 are to be formed in the fiber optical waveguide, then a larger number of strips of material would be removed. For example, n strips would be removed to form n fiber optical waveguide cores.

Figure 4:
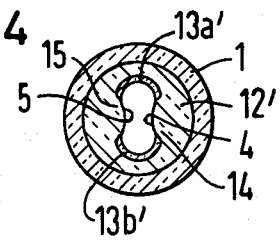
FIG. 4 is an enlarged cross sectional view after initiation of the step of collapsing the tube into a preform.

After removing the strips of the core layers such as 4 and 5 by an etching process as described hereinabove, the quartz glass tube 1 with the layer 12 and the portions 13a and 13b is heated to start collapsing it into the preform of FIG. 5. As illustrated in FIG. 4 during the initial portion of the step of collapse resulting from the heating, the area having the smallest wall thickness which are the areas in which the strips 4 and 5 were removed will collapse more quickly. Thus, the cross section of the tube interior will buckle into a figure eight with waist portions 14 and 15 appearing in the area of the strips 4 and 5. In the region the strips 4 and 5, the layers 12' of cladding material will melt and move towards each other to separate the portions 13a' and 13b' which in turn will melt to form the two waveguide cores 3a and 3b as illustrated in FIG. 5.

It should be pointed out that none of the figures is represented to scale, especially in the case of FIGS. 4 and 5 which are enlarged cross sectional views for purposes of illustration. Also, the exterior shape of the quartz glass tube 1 may deviate from a circular shape in its cross section during the step of collapsing. Nevertheless, despite the inward contracting which occurs in the case of sufficient heating, a circular shaped fiber optical waveguide preform will be formed by means of surface tension of the glass. This preform as presented in FIG. 5 is subsequently drawn in a known manner into an actual fiber optical waveguide. It should also be noted that during the subsequent drawing steps the mutual spacing relationships between the cores such as 3a and 3b, the cladding material 2, and the outer quartz glass 1 will not be changed.

Although various minor modifications may be suggested by those versed in the art, it should be understood that I wish to embody within the scope of the patent granted hereon, all such modifications are reasonably and properly come within the scope of my contribution to the art.

I claim:

1. A method for the manufacture of a multi-channel fiber optical wave guide having several fiber optical wave guide cores embedded in a fiber optical wave guide cladding material, the method comprising providing a quartz glass tube having an interior surface, providing a cladding layer on the interior surface of the glass tube, applying a core glass layer on the cladding layer, removing a number of strips of the core glass layer to form a plurality of strips of the core glass, each of the strips of the core glass being distributed symmetrically on the circumference of the layer of cladding material and extending parallel to the axis of the glass tube, and then heating the glass tube to such an extent that it collapses into a rod shaped preform with each of the strips of the core material forming core preforms surrounded with cladding material, and then subsequently drawing the preform into a said fiber.

2. A method according to claim 1, wherein the material forming the cladding layer has a viscosity lower than the viscosity of the material forming the core glass layer.

3. A method according to claim 1, wherein the steps of removing strips of the core glass layer comprises removing the strips by means of a gas phase etching process.

4. A method according to claim 3, wherein the cladding material has a viscosity lower than the viscosity of the core glass material.

5. A method according to claim 3, wherein the gas phase etching process includes passing a gas selected from a group consisting of hydrogen, deuterium, water vapor and halides through the quartz glass tube and creating a local burning spot on the tube and guiding said spot along the length of the tube in a direction extending parallel to the axis of said tube to remove a strip of the core glass layer.

6. A method according to claim 1, wherein the step of providing the layer of cladding material and providing the core glass layer comprises chemically vapor depositing each of said layers in sequence on the interior surface of said tube.

* * * * *